(12) United States Patent
Lagrue

(10) Patent No.: US 6,487,823 B2
(45) Date of Patent: Dec. 3, 2002

(54) VEHICLE WINDOW GLAZING EDGE SEAL PROFILE

(75) Inventor: Herve Lagrue, Thionville (FR)

(73) Assignee: Centre Luxembourgeois de Recherches pour le Verre et la Ceramique S.A., Dudelange (LU)

(*) Notice: Subject to any disclaimer, the term of this patent is extended or adjusted under 35 U.S.C. 154(b) by 0 days.

(21) Appl. No.: 09/797,920

(22) Filed: Mar. 5, 2001

(65) Prior Publication Data
US 2002/0121054 A1 Sep. 5, 2002

(51) Int. Cl.⁷ .................................................. E06B 3/00
(52) U.S. Cl. ....................... 52/208; 52/716.8; 52/717; 428/122; 296/93; 296/146.15; 277/630
(58) Field of Search ......................... 52/716.5, 717.03, 52/717.05, 204.53, 204.69, 208

(56) References Cited

U.S. PATENT DOCUMENTS

| | | | |
|---|---|---|---|
| 4,358,917 A | * 11/1982 | Oda et al. ...................... 52/717 |
| 4,571,278 A | 2/1986 | Kunert |
| 4,765,673 A | * 8/1988 | Frabotta et al. ................ 296/93 |
| 4,765,936 A | 8/1988 | Ballocca |
| 4,826,232 A | 5/1989 | Wissler |
| 4,833,847 A | 5/1989 | Inayama et al. |
| 4,933,032 A | 6/1990 | Kunert |
| 5,032,444 A | * 7/1991 | Desir, Sr. ..................... 428/122 |
| 5,054,242 A | 10/1991 | Keys et al. |
| 5,095,669 A | 3/1992 | Kunert et al. |
| 5,154,028 A | 10/1992 | Hill et al. |
| 5,248,179 A | * 9/1993 | Biermacher et al. ... 296/146.15 |
| 5,384,995 A | 1/1995 | Kunert et al. |
| 5,507,992 A | 4/1996 | Yada et al. |
| 5,519,979 A | 5/1996 | Kunert et al. |
| 5,591,528 A | 1/1997 | Fisher et al. |
| 5,603,546 A | 2/1997 | Desir, Sr. |
| 5,792,405 A | 8/1998 | Tsuchida et al. |
| 5,842,731 A | * 12/1998 | Gold ............................ 296/93 |
| 5,927,040 A | * 7/1999 | Kuwabara ................... 52/716.8 |
| 6,017,038 A | * 1/2000 | Wato et al. .................. 277/630 |
| 6,030,020 A | 2/2000 | Malm |
| 6,086,695 A | 7/2000 | Kreye |
| 6,203,639 B1 | 3/2001 | Swanson et al. |

FOREIGN PATENT DOCUMENTS

| | | | |
|---|---|---|---|
| EP | 0 310 226 | 4/1989 | |
| FR | WO 00/17002 | * 9/1999 | ............ B60J/10/02 |
| GB | 2 186 312 | 8/1987 | |
| WO | WO 97/17221 | 5/1997 | |
| WO | WO 00/17002 | 3/2000 | |

* cited by examiner

Primary Examiner—Carl D. Friedman
Assistant Examiner—Steve M. Varner
(74) Attorney, Agent, or Firm—Nixon & Vanderhye P.C.

(57) ABSTRACT

An edge seal polymer profile (31) attached proximate the peripheral edge of a vehicle window glazing (1), wherein the profile (31) is adapted to cover the gap or channel between the glazing edge and the adjacent vehicle window frame in an aesthetically pleasing manner. In an exemplary embodiment, a flexible lip of the profile (31) bends back toward the exterior surface (2) of the glazing/substrate upon insertion of the glazing into the vehicle window frame, thereby bending or flexing into a position where an end portion (e.g., approximately T-shaped end portion) of the lip is approximately flush with the exterior surface (2) of the glazing and the exterior surface of the window frame. Thus, the end portion of the lip covers the gap or channel between the glazing edge and the adjacent window frame after being bent due to the glazing's placement/insertion into the vehicle window frame, and a portion of the distal end portion of the lip comes to rest upon a resting wall (43) of the base portion of the polymer profile.

16 Claims, 3 Drawing Sheets

US 6,487,823 B2

VEHICLE WINDOW GLAZING EDGE SEAL PROFILE

This invention relates to an edge seal profile to be attached proximate the peripheral edge of a vehicle window glazing. In particular, this invention relates to the shape of a flexible lip for such an edge seal profile.

BACKGROUND OF THE INVENTION

It is known to provide a glass substrate with a frame-like polymer profile proximate an edge portion thereof. For example, see U.S. Pat. No. 5,154,028, the disclosure of which is hereby incorporated herein by reference. Such profiles may act as a weather seal between the glazing and an adjacent vehicle window frame. In other instances, such profiles may be used as an intermediate body (or spacer) to which an adhesive bead is applied during the assembly of automotive windows, where the bead bonds the profile to a corresponding window frame of the vehicle. Such profiles often include a lip that may be used either for centering purposes (e.g., see U.S. Pat. No. 5,384,995, incorporated herein by reference), or alternatively as a weatherstrip (e.g., water seal) and/or gap covering unit.

FIG. 1 illustrates a known polymer profile frame (same as frame profile herein) bonded to a glass substrate in a vehicle window application, from U.S. Pat. No. 5,095,669 which is incorporated herein by reference. The window assembly of FIG. 1 includes: (a) glass substrate 1 including exterior surface 2, interior surface 4, and peripheral edge 6, (b) vehicle window frame 3 (e.g., of sheet metal) including attachment flange 5 and frame section 7, (c) profile 9 including lip 11 extending from base portion 13, and (d) adhesive 15 for bonding the glazing/substrate 1 to flange 5 of the window frame 3. Opaque baked enamel layer 17 and primer 19 are sequentially provided on the substrate 1 between the profile 9 and the substrate itself. Surface 2 of substrate 1 is the exterior window surface and is thus exposed to the ambient atmosphere outside the vehicle on which the window assembly is mounted. The '669 patent states that lip 11 is provided in order to center and align the window substrate 1 within the frame 3.

FIG. 2 illustrates another known polymer profile frame bonded to a glass substrate around all sides thereof in a vehicle window application, from U.S. Pat. No. 5,384,995 which is incorporated herein by reference. The window assembly of FIG. 2 includes: (a) glass substrate 1 including exterior surface 2, interior surface 4, and peripheral edge 6, (b) vehicle window frame 3 including attachment flange 5 and frame section 7, (c) profile 9 including lip 11 extending from base portion 13, and (d) adhesive 15 mounted on the profile for bonding the glazing/substrate 1 to flange 5 of the window frame 3. Opaque baked enamel layer 17 is provided on the substrate 1 between the profile 9 and the substrate itself. Surface 2 of substrate 1 is the exterior window surface and is exposed to the ambient atmosphere outside the vehicle on which the window assembly is mounted. The '995 patent states that lip 11 is provided in order to center the window substrate 1 within the frame 3.

Unfortunately, the window assemblies of FIGS. 1 and 2 both suffer from the problem of having a deep trough (or channel) 21 extending down beyond/below surface 2 of substrate 1 proximate the edge 6 of the substrate. These deep troughs 21 are defined on the inside by peripheral edge 6 of the substrate and on the outside by lip 11 and/or frame section 7. Troughs 21 are problematic in that they: (i) tend to collect water during rainy conditions, (ii) tend to collect dirt during muddy and/or dry conditions, and/or (iii) are considered aesthetically displeasing to some.

Other patents such as U.S. Pat. Nos. 6,086,695 and 4,833,847 disclose profiles that include a lip that covers the trough (or channel) between the glass edge and the window frame. Unfortunately, these profiles tend to be less than desirable for water sealing purposes in certain environments.

WO 00/17002 discloses a glazing edge seal profile including a lip having a T-shaped distal end. Unfortunately, when the glazing and profile of WO/00/17002 are installed in a vehicle window frame, an end of the "T" comes to rest upon a vertical edge of the glazing itself. This is problematic because it can lead to a less than desirable sealing effect.

In view of the above, it will be apparent to those skilled in the art that there exists a need for a glazing profile that: covers the channel between the glazing edge and the adjacent window frame in a substantially flush manner; provides a good water seal between the window frame and glazing; and/or is aesthetically pleasing.

SUMMARY OF THE INVENTION

An object of this invention is to provide an edge seal profile attached proximate the peripheral edge of a vehicle window glazing, wherein the profile covers the gap or channel between the glazing edge and the adjacent vehicle window frame in an aesthetically pleasing manner.

Another object of this invention is to provide glazing edge profile including a flexible lip that bends back toward the exterior surface of the glazing/substrate upon insertion of the glazing into a vehicle window frame, thereby bending/flexing into a position where an end portion (e.g., approximately T-shaped end portion) of the lip is approximately flush with the exterior surface of the glazing and the exterior surface of the window frame, and/or covers the gap or channel between the glazing edge and the adjacent window frame.

Another object of this invention is to fulfill one or more of the above-listed objects.

In certain exemplary embodiments of this invention, one or more of the above-listed objects is/are fulfilled by providing a vehicle window assembly comprising:

a substrate or glazing having an exterior surface and an interior surface;

a polymer profile attached to both (i) a peripheral edge of said substrate or glazing, and (ii) said interior surface of said substrate or glazing proximate said peripheral edge;

wherein said polymer profile includes a flexible lip extending from a base portion, said base portion including a resting wall, and said flexible lip including a flexible neck and an approximately T-shaped distal end; and wherein when said substrate or glazing with said polymer profile thereon is inserted into a vehicle window frame, said lip bends back toward the exterior surface of said substrate or glazing so that in the resulting vehicle window assembly: (a) the approximately T-shaped distal end of said lip covers a gap or channel adjacent said substrate or glazing, (b) an exterior surface of said approximately T-shaped distal end is approximately flush with said exterior surface of said substrate or glazing, and (c) a portion of said approximately T-shaped distal end contacts and is supported by said resting wall of said base portion.

In certain other example embodiments of this invention, one or more of the above-listed objects may be fulfilled by providing a vehicle window assembly comprising:

a substrate or glazing having an exterior major surface and an interior major surface;

a polymer profile attached to at least an edge of said substrate or glazing;

wherein said polymer profile includes a flexible lip extending from a base portion, said flexible lip including a flexible neck and an approximately T-shaped distal end; and wherein when said substrate or glazing with said polymer profile thereon is inserted into a vehicle window frame, said lip contacts the vehicle window frame and bends toward the exterior surface of said substrate or glazing so that in the resulting vehicle window assembly: (a) the approximately T-shaped distal end of said lip covers a gap or channel defined between said base portion of said profile and said window frame, (b) an exterior surface of said distal end is approximately flush with said exterior surface of said substrate or glazing, and (c) said distal end of said lip contacts each of said base portion of said profile and said window frame.

In certain other example embodiments of this invention, one or more of the above-listed objects may be fulfilled by providing a method of making a vehicle window assembly, the method comprising:

providing a glazing having an exterior major surface, with a polymer profile attached proximate an edge of the glazing wherein the polymer profile includes a flexible lip; and positioning or inserting the glazing with polymer profile thereon into a vehicle window frame in a manner such that the lip contacts the vehicle window frame and bends toward the exterior surface of the glazing so that: a) a distal end of the lip covers a gap or channel adjacent the window frame, b) the distal end is approximately flush with the exterior surface of the glazing, and c) a portion of the distal end comes to rest upon a portion of said polymer profile.

DETAILED DESCRIPTION OF CERTAIN EMBODIMENTS OF THIS INVENTION

Figure 1:
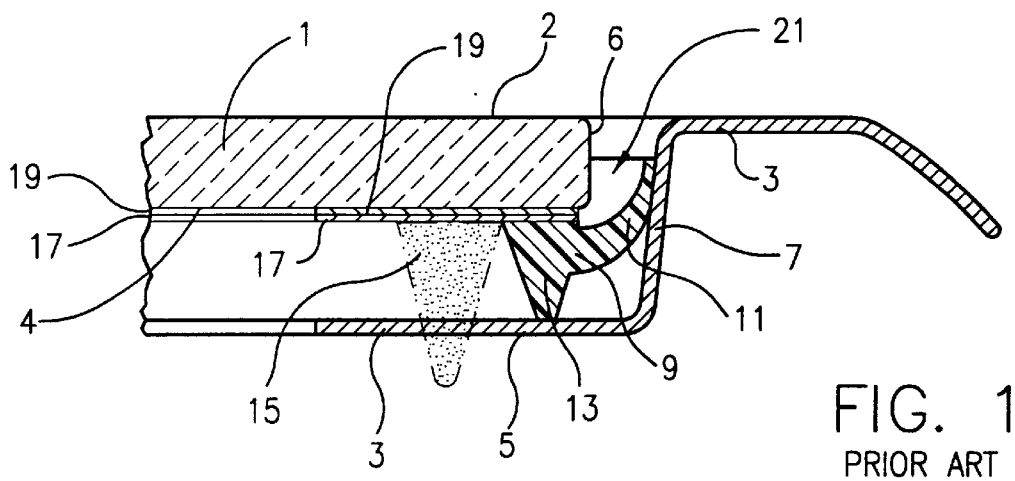
FIG. 1 cross sectional view of a conventional vehicle window unit.
Figure 2:
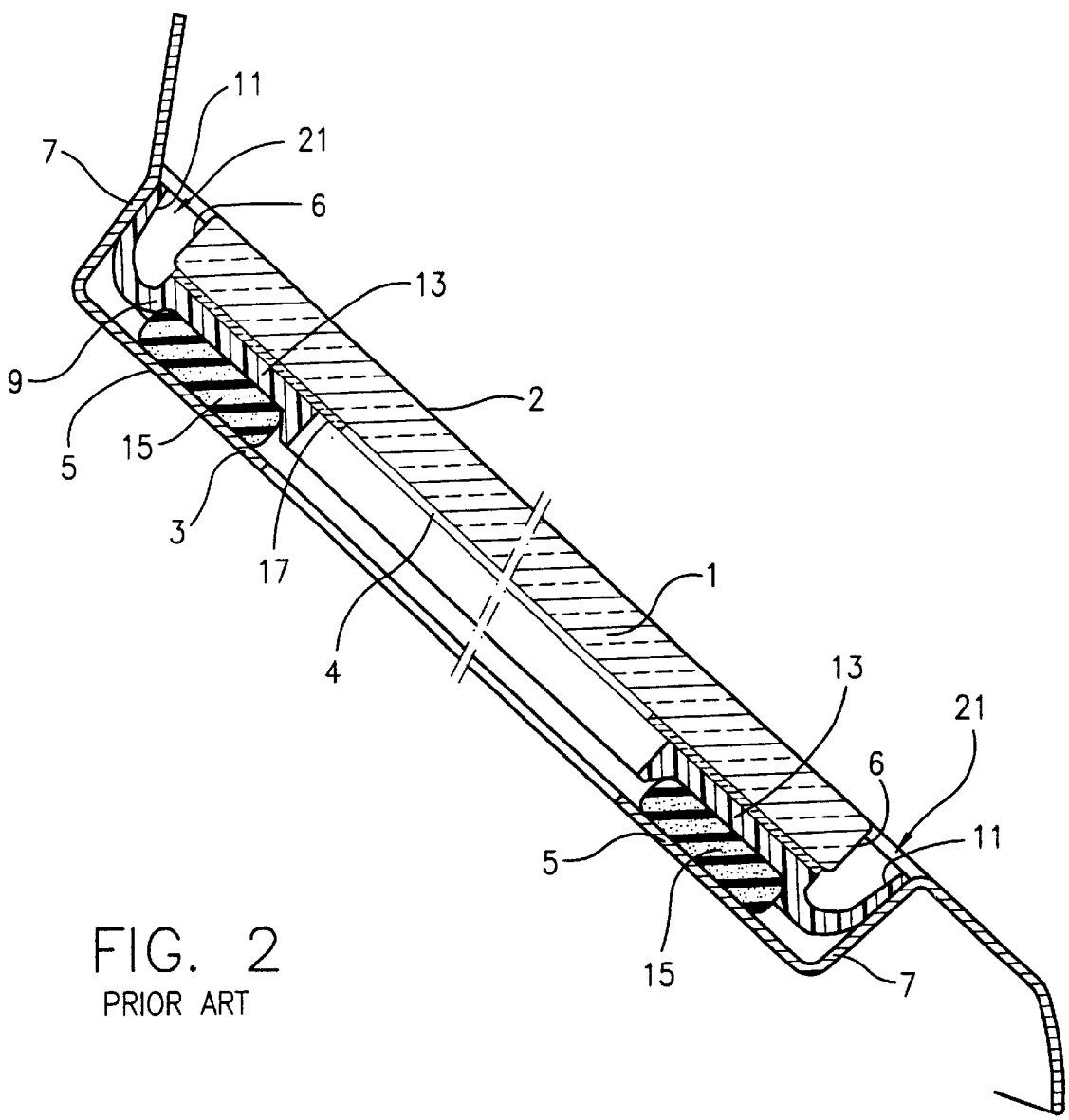
FIG. 2 is a cross sectional view of another conventional vehicle window unit.

In the following description, for purposes of explanation and not limitation, specific details are set forth in order to provide an understanding of certain embodiments of the present invention. However, it will be apparent to those skilled in the art that the present invention may be practiced in other embodiments that depart from these specific details. In other instances, detailed descriptions of well known devices, processes, techniques, and methods are omitted so as to not obscure the description with unnecessary detail. Referring now more particularly to the accompanying drawings, in which like reference numerals indicate like parts/elements throughout the several views.

The instant invention relates to an edge seal polymer profile attached proximate the peripheral edge of a vehicle window glazing, wherein the profile is adapted to cover the gap or channel between the glazing edge and the adjacent vehicle window frame in an aesthetically pleasing manner. In particular, a flexible lip of the profile bends back toward the exterior surface of the glazing/substrate upon insertion of the glazing into the vehicle window frame, thereby bending or flexing into a position where an end portion (e.g., approximately T-shaped end portion) of the lip is approximately flush with the exterior surface of the glazing and the exterior surface of the window frame. Thus, the end portion of the lip covers the gap or channel between the glazing edge and the adjacent window frame after being bent due to the glazing's placement/insertion into the vehicle window frame.

Certain advantages may be realized in certain embodiments of this invention. For example, covering of the gap or channel between the glazing edge and vehicle window frame reduces the likelihood of water and/or dirt collecting in the gap or channel. Moreover, because of the flexing/bending of the lip during insertion of the glazing (and profile) into the window frame, the lip ends up being biased into contact with at least a portion of the window frame in order to form a good water/dirt seal therebetween. Furthermore, because the covering end of the lip may be approximately flush with the exterior surface of the glazing when covering the gap or channel in certain exemplary embodiments, the resulting vehicle window assembly is aesthetically pleasing.

Figure 3:
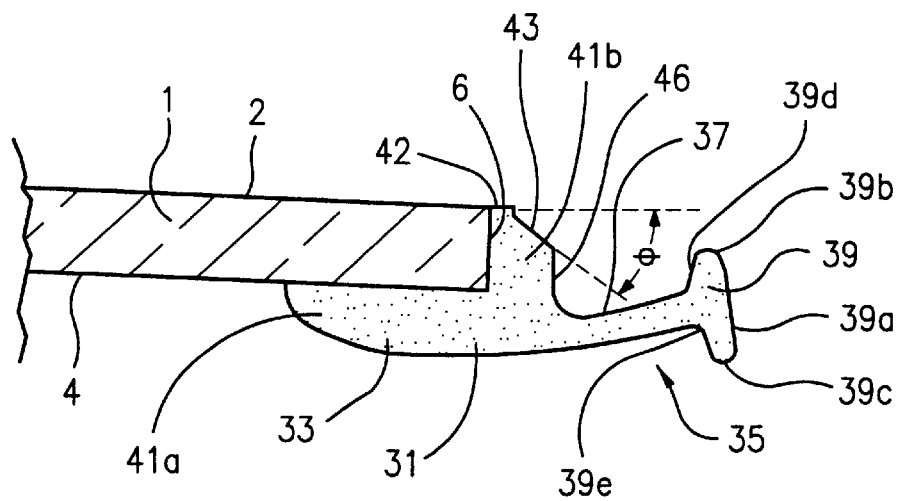
FIG. 3 is a cross sectional view of a glazing with polymer edge seal profile thereon according to an embodiment of this invention, before being placed in a vehicle window frame.

FIG. 3 is a cross sectional view of glazing (e.g., glass substrate) 1 with polymer edge seal profile 31 thereon according to an embodiment of this invention. FIG. 3 illustrate the combination of the glazing 1 and polymer frame profile 31 immediately after the profile 31 has been bonded/attached to the glazing (i.e., before being placed in a vehicle window frame). Optionally, a dark or black baked enamel layer (not shown) and/or a primer layer (not shown) may be provided on the glazing between the interior surface 4 of the glazing and profile 31. Thus, herein profile 31 is considered "on" the glazing 1, "supported by" the glazing, "adhered to" the glazing, and "bonded to" the glazing even though additional layer(s) (e.g., primer layer(s), opaque layer(s), etc.) may be provided therebetween.

Glazing 1 is preferably a glass sheet (flat or slightly bent) to be used as a window in a vehicle (e.g., side window, backlite, or windshield). Glazing/substrate 1 is illustrated monolithically (i.e., single sheet), but it will be appreciated by those skilled in the art that glazing 1 may instead be a laminate including multiple glass sheets/layers in certain embodiments of this invention. Exterior major surface 2 of the glazing 1 is exposed to the atmosphere outside the vehicle once the window unit has been installed, while interior major surface 4 of the glazing is exposed to the vehicle interior. Surfaces 2 and 3 of glazing 1 are approximately parallel (i.e., whether bent or flat) to one another in preferred embodiments of this invention.

Polymer profile 31 may be formed in a variety of manner in different embodiments of this invention. For example, profile 31 may be formed by reaction injection molding onto the glazing in preferred embodiments of this invention where the mold is brought up against the glazing itself and molten polymer shot thereinto. Alternatively, profile 31 may be formed via extrusion, injection molding, or any other suitable technique. Polymer profile 31 may include or be of any suitable polymer material, including but not limited to polyurethane (PU) (one or multiple component), polyvinyl chloride (PVC), thermoplastic rubber (TPR), thermoplastic urethane, thermoplastic olefin (TPO), and/or thermoplastic elastomer (TPE). Profiles 31 herein may be applied along only one or two side(s) of glazing/substrate 1 in certain embodiments (e.g., for a vehicle windshield), but in other embodiments may be applied around the entire circumference or edge (i.e., four sides) of the glazing (e.g., vehicle backlite or rear window embodiments).

Profile 31 includes base portion 33 and flexible lip 35 extending therefrom. Flexible lip 35 includes both a thin flexible neck 37 and approximately T-shaped distal end 39. Approximately T-shaped distal end 39 of lip 35 includes an approximately flat (i.e., flat plus/minus 20 degrees of curve or angle) major exterior surface 39a, and opposing ends 39b and 39c of the major exterior surface 39a. Angled portions 39d and 39e extend between ends 39b, 39c and neck 37, respectively. In certain exemplary embodiments, angled portions 39d and 39e form an angle(s) of from about 20 to 90 degrees with neck 37, more preferably from about 30 to 70 degrees. While distal end 39 of the lip is illustrated as being approximately T-shaped in FIGS. 3–4, it is recognized that other shapes may also be used in other embodiments of this invention.

Base portion 33 of the profile includes a first portion 41a bonded to and adjacent interior surface 4 of glazing 1, and a second portion 41b bonded to and adjacent peripheral edge 6 of glazing 1. Second portion 41b of base 33 includes: (i) a small portion 42 that is approximately flush with and extends from exterior surface 2 of the glazing, and (ii) angled support or rest portion/wall 43 that is angled downwardly away from exterior surface 2 of the glazing at an angle θ of from about 1 to 70 degrees, more preferably from about 5 to 45 degrees. In certain preferred embodiments, resting wall or portion 43 is located below the plane of exterior surface 2 of glazing 1. Wall 46 extending down from support/rest portion/wall 43 connects to lip 35. Glazing edge 6 is approximately perpendicular to surfaces 2 and 4 of the glazing; thus the bonding area of profile portion 41a is approximately perpendicular to the bonding area of profile portion 41b.

As can be seen in FIG. 3, before being inserted into a window frame, neck 46 of lip extends outwardly from the glazing edge 6 so that the lip neck 46 forms an angle with edge 6 of from about 45 to 135 degrees, more preferably from about 70 to 110 degrees. Thus, in preferred embodiments, neck 46 is approximately parallel (parallel plus/minus 20 degrees) to surfaces 2 and/or 4 of the glazing before being inserted into the window frame.

Figure 4:
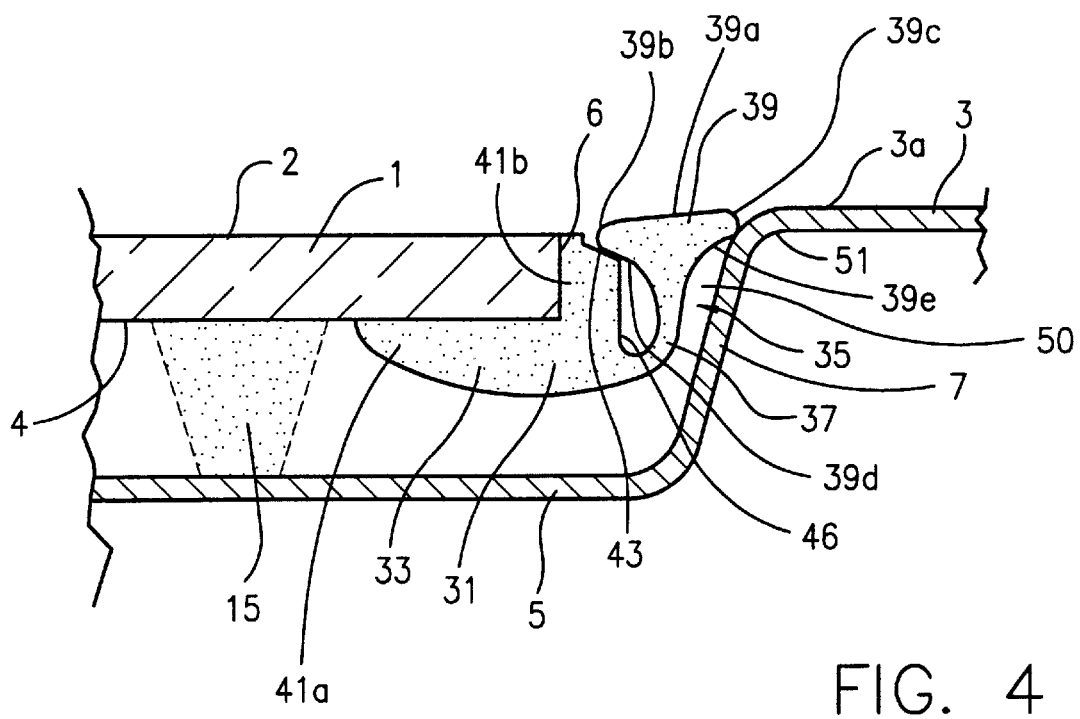
FIG. 4 is a cross sectional view of the glazing with polymer edge seal profile thereon of FIG. 3, after being placed in a vehicle window frame.

FIG. 4 illustrates what happens when glazing 1 with profile 31 thereon is/are inserted into window frame 3 (e.g., of sheet metal) including attachment flange 5 and frame section 7. Flange 5 is approximately parallel (i.e., parallel plus/minus 20 degrees) to interior glazing surface 4 in certain embodiments, while section 7 forms an angle with flange 5 of from about 90 to 140 degrees in different embodiments of this invention.

As shown in FIG. 4, when the glazing 1 is inserted/positioned in the window frame 3, distal end 39 of profile lip 35 contacts the exterior surface 3a of the window frame 3 and bends from its FIG. 3 position upward/back to its FIG. 4 position. Thus, the distal end 39 of lip bends/flexes from about 20 to 110 degrees, more preferably from about 45 to 100 degrees, and most preferably from about 70 to 95 degrees when the glazing is inserted into the window frame. Distal end 39 of the lip is said to bend herein, even though technically it is the neck 37 of the lip which is bending. Adhesive 15 is provided for bonding the glazing to the window frame.

When lip 35 is bent to its new FIG. 4 position, distal end 39 thereof covers the gap or channel 50 defined between section 7 of the vehicle window frame and wall 46 of the profile base portion. In its FIG. 4 position, distal end 39 (at end 39c and/or angled portion 39e) is biased into sealing contact with exterior surface 3a of the window frame within 0.5 inches of corner 51 thereof. Moreover, the distal end 39 (at end 39b and/or angled portion 39d) is also in sealing contact with angled resting/supporting wall 43 of the profile base. Causing distal end 39 to contact and be biased against support or resting wall 43 in the final installed position provides a superior weather seal and/or reduces the likelihood (prevents in preferred embodiments) of water and/or dirt collecting in this gap/channel 50. When lip distal end 39 is in its FIG. 4 position, major surface 39a thereof is approximately flush (i.e., flush plus/minus 1.5 mm) with the exterior surface 2 of glazing 1 and/or exterior surface 3a of the window frame thereby providing as aesthetically pleasing profile seal.

The shapes and/or functionality described above associated with certain example embodiments of this invention enable the distal end of the profile lip to be/remain approximately flush with the exterior glazing surface even with normal variations (i.e., due to tolerances) in the size of the gap between the window frame and glazing. This is difficult to achieve with conventional extrusion technology in view of extrusion tolerances.

Figure 5A:
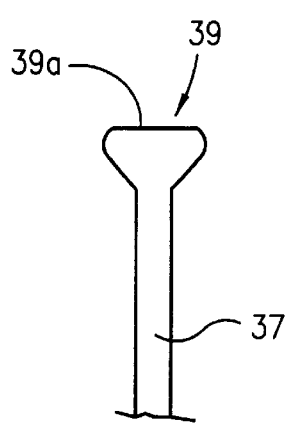
FIGS. 5(a)–(c) are cross sectional views illustrating alternative shapes for the distal end of the lip according to embodiments of this invention.
Figure 5B:
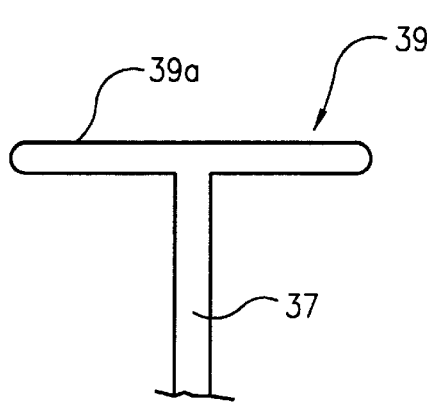
Figure 5C:
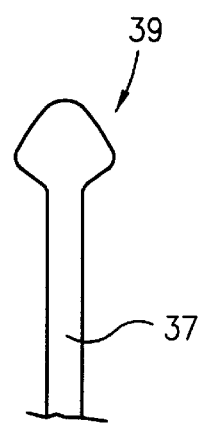

However, the shapes illustrated in FIGS. 3–4 are provided for purposes of example only and are not intended to be limiting. For example and without limitation, distal end 39 of the lip may instead be shaped as illustrated in any of FIGS. 5(a)–(c), all of which are considered approximately T-shaped.

While the profile in FIGS. 3–4 is shown bonded to both the interior surface 4 and edge 6 of glazing 1, in other embodiments of this invention the profile may for example be bonded only to interior surface 4 and not edge 6.

While the invention has been described in connection with what is presently considered to be the most practical and preferred embodiments, it is to be understood that the invention is not to be limited to the disclosed embodiments. To the contrary, the invention is intended to cover various modifications and equivalent arrangements included within the spirit and scope of the appended claims.

What is claimed is:

1. A vehicle window assembly comprising:
   a substrate or glazing having an exterior surface and an interior surface;
   a polymer profile attached to both (i) a peripheral edge of said substrate or glazing, and (ii) said interior surface of said substrate or glazing proximate said peripheral edge;
   wherein said polymer profile includes a flexible lip extending from a base portion, said base portion including a resting wall, and said flexible lip including a flexible neck and an approximately T-shaped distal end; and
   wherein when said substrate or glazing with said polymer profile thereon is inserted into a vehicle window frame, said lip bends back toward the exterior surface of said substrate or glazing so that in the resulting vehicle window assembly: (a) the approximately T-shaped distal end of said lip covers a gap or channel adjacent said substrate or glazing, (b) an exterior surface of said approximately T-shaped distal end is approximately flush with said exterior surface of said substrate or glazing, and (c) a portion of said approximately T-shaped distal end contacts and is supported by said resting wall of said base portion so that at least a portion of the resting wall is located between (i) the portion of an interior surface of the approximately T-shaped distal end contacting the resting wall and (ii) the substrate or glazing.

2. The vehicle window assembly of claim 1, wherein said lip bends from about 45 to 100 degrees when said substrate or glazing with said polymer profile thereon is inserted into the vehicle window frame.

3. The vehicle window assembly of claim 2, wherein said lip bends from about 70 to 95 degrees when said substrate or glazing with said polymer profile thereon is inserted into the vehicle window frame.

4. The vehicle window assembly of claim 1, wherein said approximately T-shaped distal end of said lip comprises: an approximately flat major exterior surface having first and second end portions, and first and second angled portions extending between said first and second ends, respectively, and said neck.

5. The vehicle window assembly of claim 4, wherein said resting wall extends at an angle $\theta$ of from about 1 to 70 degrees relative to said exterior surface of said substrate or glazing.

6. The vehicle window assembly of claim 5, wherein said resting wall extends at angle $\theta$ of from about 5 to 45 degrees relative to said exterior surface of said substrate or glazing.

7. The vehicle window assembly of claim 6, wherein said resting wall is approximately flat.

8. The vehicle window assembly of claim 1, wherein said gap or channel covered by said distal end is defined between said vehicle window frame and said base portion of said profile.

9. A vehicle window assembly comprising:
a substrate or glazing having an exterior major surface and an interior major surface;
a polymer profile attached to at least an edge of said substrate or glazing;
wherein said polymer profile includes a flexible lip extending from a base portion, said flexible lip including a flexible neck and an approximately T-shaped distal end; and
wherein when said substrate or glazing with said polymer profile thereon is inserted into a vehicle window frame, said lip contacts the vehicle window frame and bends toward the exterior surface of said substrate or glazing so that in the resulting vehicle window assembly: (a) the approximately T-shaped distal end of said lip covers a gap or channel defined between said base portion of said profile and said window frame, (b) an exterior surface of said distal end is approximately flush with said exterior surface of said substrate or glazing, (c) said distal end of said lip contacts said window frame, and (d) an interior surface of said distal end that faces an interior of the vehicle contacts a resting wall of the base portion.

10. The vehicle window assembly of claim 9, wherein said lip bends from about 45 to 100 degrees when said substrate or glazing with said polymer profile thereon is inserted into the vehicle window frame.

11. The vehicle window assembly of claim 9, wherein said approximately T-shaped distal end of said lip comprises: an approximately flat major exterior surface having first and second end portions, and first and second angled portions extending between said first and second ends, respectively, and said neck.

12. The vehicle window assembly of claim 9, wherein said polymer profile further comprises a resting wall extending at an angle $\theta$ of from about 1 to 70 degrees relative to said exterior surface of said substrate or glazing, and wherein said distal end of said lip contacts and is supported by said resting wall in the resulting vehicle window assembly.

13. A vehicle window assembly comprising:
a substrate or glazing having an exterior major surface and an interior major surface;
a polymer profile attached to said substrate or glazing proximate an edge of the substrate or glazing;
wherein said polymer profile includes a flexible lip including a distal end extending from a base portion;
wherein when said substrate or glazing with said polymer profile thereon is inserted into a vehicle window frame, said lip contacts the vehicle window frame and bends toward the exterior surface of said substrate or glazing so that in the vehicle window assembly said distal end of said lip covers a gap or channel adjacent to said window frame and comes to rest against each of the vehicle window frame and said base portion of said base portion of said polymer profile;
wherein said distal end of said lip contacts each of a resting wall of said base portion of said profile and said window frame in the window assembly, wherein said resting wall extends at angle $\theta$ of from about 5 to 45 degrees relative to a plane defined by said exterior major surface of said substrate or glazing; and
wherein said distal end is approximately T-shaped, and wherein an exterior surface of said distal end is approximately flush with said exterior surface of said substrate or glazing in the window assembly, and an interior surface of said distal end which faces an interior of the vehicle contacts said resting wall of the base portion of the profile.

14. A method of making a vehicle window assembly, the method comprising:
providing a glazing having an exterior major surface, with a polymer profile attached proximate an edge of the glazing wherein the polymer profile includes a flexible lip; and
positioning or inserting the glazing with polymer profile thereon into a vehicle window frame in a manner such that the lip contacts the vehicle window frame and bends toward the exterior surface of the glazing so that: a) a distal end of the lip covers a gap or channel adjacent the window frame, b) an exterior surface of the distal end is approximately flush with the exterior surface of the glazing, and c) an interior surface of the distal end which faces an interior of the vehicle comes to rest upon a portion of said polymer profile.

15. The method of claim 14, further comprising: positioning or inserting the glazing with polymer profile thereon into a vehicle window frame in a manner such that the distal end of the lip contacts each of a base portion of the polymer profile and the window frame in a resulting vehicle window assembly.

16. A vehicle window assembly comprising:
a substrate or glazing having an exterior surface and an interior surface;
a polymer profile attached to both (i) a peripheral edge of said substrate or glazing, and (ii) said interior surface of said substrate or glazing proximate said peripheral edge;

wherein said polymer profile includes a flexible lip extending from a base portion, said base portion including a resting wall, and said flexible lip including a flexible neck and an approximately T-shaped distal end, the approximately T-shaped distal end including an exterior surface adapted to face the vehicle exterior and an interior surface adapted to face away from the vehicle exterior; and wherein when said substrate or glazing with said polymer profile thereon is inserted into a vehicle window frame, said lip bends back toward the exterior surface of said substrate or glazing so that in the resulting vehicle window assembly: (a) the approximately T-shaped distal end of said lip covers a gap or channel adjacent said substrate or glazing, (b) a portion of the exterior surface of said approximately T-shaped distal end is approximately flush with said exterior surface of said substrate or glazing, and (c) a portion of interior surface of the approximately T-shaped distal end facing away from the vehicle exterior contacts and is supported by said resting wall of said base portion.

* * * * *